Inventor
John M. McGrew Jr.
by Paul A. Frank
His Attorney

United States Patent Office 3,355,179
Patented Nov. 28, 1967

3,355,179
GAS BUFFERED SCREW SEAL
John M. McGrew, Jr., Schenectady, N.Y., assignor to General Electric Company, a corporation of New York
Filed Aug. 24, 1964, Ser. No. 391,611
8 Claims. (Cl. 277—134)

My invention relates to seals for rotating shafts, and more particularly, to a gas buffered seal for a rotating shaft.

In the utilization of modern equipment the need arises for the provision of seals for shafts rotating in high pressure environments. With the present trend toward increased speeds, and reduction in size and weight of machinery packages, prevention of even the slightest leakage through seals is of the utmost importance. In nuclear and space applications the need becomes great for maintenance free operation; operation where even the smallest trace of leakage is intolerable. There must not be even slight leakage of nuclear reaction material to the atmosphere. Seals are also required where the liquid being sealed is of low viscosity, with a corresponding tendency to leak slightly even with the best known sealing techniques.

Presently, most noncontacting seals employed for rotating machinery, require a small, but finite leakage flow for proper operation. Leakage flow becomes greater as the viscosity of the fluid is reduced. This, in turn, leads to the employment of screw seals only with high viscosity fluids. Low viscosity fluids, such as water, can then not properly be sealed with screw seals, as presently known.

To overcome these difficulties in sealing low viscosity fluids, a high viscosity buffer fluid was employed around the circumference of the screw seal to prevent leakage. This worked well where gas was being sealed, but failed where it was necessary to seal liquid. The liquid itself mixed with the buffer fluid and formed an emulsion, which had a lower viscosity than the buffer fluid. The seal could then no longer generate the required pressure and leakage ensued, with resulting contamination of the fluid being sealed. The buffer fluid screw seals were accordingly employed only in sealing of gas mediums. The need therefore has arisen for a leakage free seal for low viscosity liquids.

My invention envisions a seal for a rotating shaft which prevents any leakage from a volume of high pressure low viscosity liquid, into which the shaft extends.

The chief object of my invention is to seal completely a rotating shaft which extends into a low viscosity, high pressure liquid without permitting even slight leakage of the liquid.

Another object of my invention is to provide a screw seal having threads for sealing a rotating shaft which extends into a low viscosity liquid.

Another object of my invention is to provide a screw seal having a high pressure gas buffer to prevent leakage of the liquid being sealed and to provide a buffer that will not mix with the substance being sealed.

Another object of my invention is to provide a screw seal that seals a liquid area by the provision of a high pressure gas buffer, which buffer is retained by means of a high pressure liquid buffer.

A still further object of my invention is to provide a screw seal that employs high pressure gas means to prevent its buffer liquid from mixing with the liquid being sealed.

These and other objects of my invention will be more readily perceived from the following description.

One of the features of my invention is a screw seal for a high pressure low viscosity liquid, including gas buffering means for preventing even slight leakage of the liquid being sealed and for preventing any contamination of the sealed liquid by the buffer.

The attached drawings illustrate preferred embodiments of my invention in which

Figure 1:
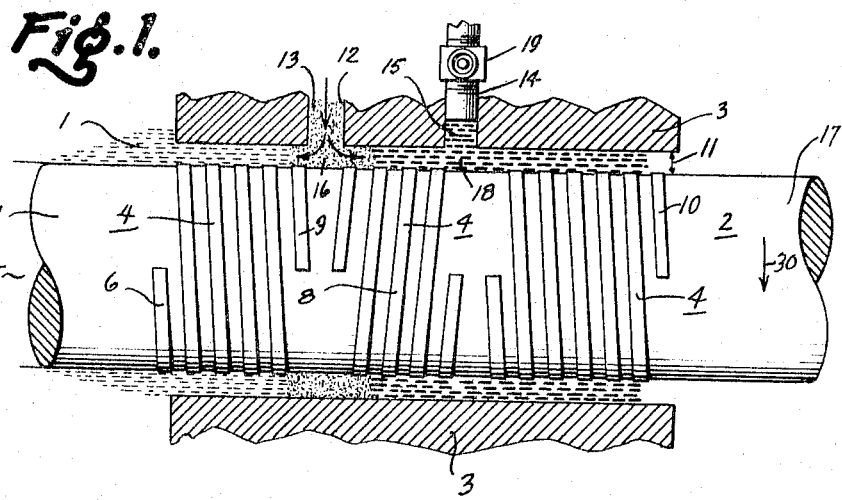
FIGURE 1 is a cross-sectional view of the above apparatus.

In FIGURE 1 there is shown a sectional view of the screw seal embodying the present invention. The construction includes screw shaft or quill 2 of uniform diameter and having three sets of helical threads thereon. Threads 4, on shaft 2, as will subsequently be described, comprise right hand thread 6 proximate to the substance 1 being sealed, right hand thread 10 adjacent the atmosphere and left hand thread 8 spaced between the aforementioned threads 6 and 10. Surrounding shaft 2 at clearance 11 therefrom is casing or wall 3, integral with the main body, through which shaft 2 projects. Through wall 3 and into clearance space 11 project buffer gas entrance port 12 and buffer liquid entrance port 14. Ports 12 and 14, provide entrance channels for buffer gas 13 and buffer liquid 15 which are provided within their respective areas, as will be described, to insure leakage free operation.

In operation the medium to be sealed, i.e., a high pressure low viscosity liquid 1, such as water, surrounds shaft 2, as it revolves in the direction indicated by arrow 30. As shaft 2 rotates, threads 6 positioned thereon spiral in a direction that forces high pressure liquid 1 back to area 5 in which the bulk of it is contained. Revolution of thread 6 on shaft 2 produces a component of velocity in liquid 1 directed towards end 7 of shaft 2. This opposing force prevents the high pressure liquid from proceeding further along the length of shaft 2, thru end 9 of threads 6. During this travel, high pressure liquid 1 maintains its initial pressure with only a slight decrease thereof, as depicted by line 20 of FIGURE 2. Therefore, as shaft 2 rotates in the direction of arrow 30 threads 6, being in a right hand direction, force the liquid being sealed back into area 5 in which it is contained. It is noted that the pitch, shape, and number of these threads is dependent on the medium being sealed, the rotation of the shaft, and other variables and therefore the illustrations with respect to these are not intended to be limiting.

Figure 2:
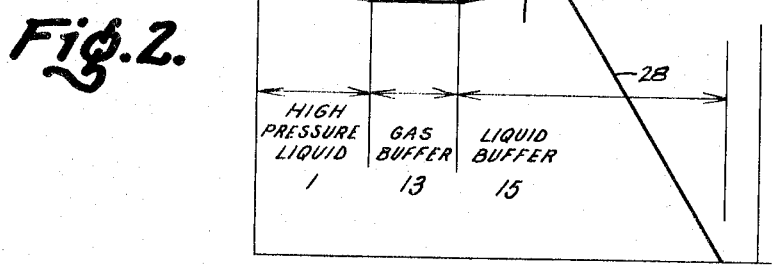
FIGURE 2 is a diagrammatical illustration of the pressure distribution along the length of the seal of FIGURES 1 and 3.

Threads 6 then significantly contribute to the total sealing effect of my screw seal, but alone they would not seal properly, since amounts of liquid could proceed further along shaft 2 than threads 6, with leakage ensuing therefrom. To prevent any leakage whatsoever gas 13 preferably an inert gas, e.g., argon or neon, at a pressure slightly less than the pressure of the liquid being sealed, is pumped through port 12 into area 16 which is located posterior to threads 6 and surrounding shaft 2. Gas 13 is kept in a bottle or other suitable container at the desired pressure, which as indicated by line 22 in FIGURE 2 is uniform and slightly less than the sealed liquid pressure. Further along shaft 2 are positioned threads 8 which are also helical threads turning in the left hand direction. Threads 8 impart a velocity component to the buffer liquid in a direction away from sealed liquid 1 and prevent buffer liquid 15, as will be subsequently described, from leaking into area 16.

Located further along shaft 2 adjacent the atmosphere are positioned threads 10 which turn in the right hand direction, in the same manner as threads 6, to impart a component of velocity to buffer liquid 15 in a direction towards sealed liquid 1. Buffer liquid 15 is thus prevented from leaking to the atmosphere.

Buffer liquid 15, e.g., high pressure oil, is pumped into area 18 surrounding shaft 2 through port 14, which is then sealed by suitable closure means such as valve 19 as shown in FIGURE 1. As indicated by line 26 in FIGURE 2, the pressure of buffer liquid 15 at inlet port 14 is only slightly greater than the pressure of buffer gas 13 and is equal to buffer gas pressure when in contact therewith, as indicated by line 24 in FIGURE 2. Due to this pressure of buffer liquid 15, buffer gas 13, is maintained within area 16, to aid in preventing leakage of the liquid being sealed. Buffer liquid 15 is effectively entrapped within area 18 by the combination of threads 8 and 10. Threads 8 spiral in the left hand direction on shaft 2 to force buffer liquid 15 toward atmospheric end 17 of shaft 2 to prevent its encroaching into area 16, in which gas 13 is maintained. On the other side of buffer liquid 15, threads 10 spiral in a right hand direction to force buffer liquid 15 towards its entrance port 14 to prevent its dissipation to the atmosphere. As shown in FIGURE 2, there is a slight decrease in the pressure of buffer liquid 15 when in contact with gas 13, but there is a rapid decrease to atmospheric pressure as the buffer liquid finally comes into contact with the atmosphere. Therefore, threads 8 and 10 effectively contain buffer liquid in area 18 in which it is placed and prevent its mixing with buffer gas 13 or dissipating to the atmosphere. Buffer liquid 15 aids in the sealing process in preventing gas 13 from dissipating and thereby permitting leakage of the liquid being sealed. It will be appreciated that without gas 13, buffer liquid 15 and the liquid being sealed would mix, thereby contaminating the liquid being sealed and dissipating the effectiveness of the buffer liquid. Thus, because of high pressure gas 13 therebetween there is complete separation of the liquid being sealed and buffer liquid 15, to insure contamination-free operation.

Figure 3:
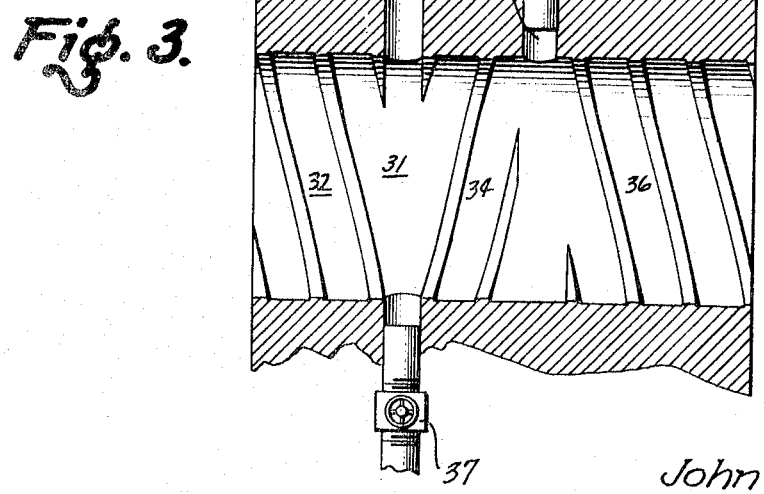
FIGURE 3 is a cross-sectional view of a modification of the seal of FIGURE 1.

FIGURE 2 graphically illustrates the pressure distribution along the length of the seal of my invention, as depicted in FIGURES 1 and 3. The pressures illustrated are pressures above atmospheric pressure with the horizontal axis being the length along the seal and the vertical axis being the increase in pressure. Line 20 indicates the pressure distribution from the sealed liquid inlet point 21 to the end of threads 6. The pressure remains very nearly at the high entrance level pressure with a slight decrease due to the slightly lower pressure of buffer gas 13. Line 22 indicates that buffer gas 12 remains at its constant entrance pressure throughout area 16 into which it is pumped. Horizontal line 26 depicts the inlet pressure of buffer liquid 15, which enters port 14 at approximately the same pressure as sealed liquid 1, and then decreases slightly in pressure to the same pressure as buffer gas 13, as indicated by line 24. Buffer liquid 15 drops to atmospheric pressure along the length of threads 10, as line 28 indicates, when it finally becomes exposed to the atmosphere. The pressure distribution indicates the success of my invention in maintaining the sealed liquid under its desired high pressure without any dissipation thereof.

FIGURE 3 depicts a cross-sectional view of a modification of the seal of FIGURE 1 wherein the threads are located on casing or wall 31 instead of on the rotating shaft. For illustration purposes, the rotating shaft which is smooth in construction has been removed. The operation is exactly the same as the aforementioned mode of FIGURE 1 whereby the seal effectively combines leakage-free operation with noncontamination of the sealed medium. First series of threads 32 operate in the same manner as do threads 6 in FIGURE 1, to retard leakage of the liquid being sealed and prevent its proceeding further than point 33 at the end of threads 32. It is noted that threads 32, as with the threads 34 and 36, are oppositely directed from the respective equivalents in FIGURE 1. This is true, since the significant velocity component I am interested in is the relative velocity of the liquid with respect to the shaft or casing 31. This is the velocity of the liquid as it would appear to one standing on the shaft or standing on casing 31 with the other member rotating. The direction of this component would then be the same as in the mode of FIGURE 1 with the threads on the casing as in FIGURE 3, in the reverse direction, since they are on the opposite member; casing 31 instead of the shaft. Threads 34 and 36 operate in the same manner as in FIGURE 1 to provide a seal identical in operation to that of FIGURE 1. It will be appreciated that the pressure distribution of FIGURE 2 applies equally to the mode of FIGURE 3. Valve 37 as depicted in FIGURE 3 alternatively is employed as a buffer gas bleed for recirculation purposes.

It is further noted that the number of turns of the threads, the number of threads and the pitch and other variables of the threads shown in the illustrations are not to be taken as limiting, but as exemplary, depending on the medium being sealed, the rotation of the shaft, and other variables inherent therein.

These threads provide a most effective seal for a low viscosity-high pressure liquid into which a rotating shaft extends without permitting either the slightest leakage through the seal or contamination of the liquid being sealed by permitting intermixing with the sealing mediums.

It will further be appreciated that liquid metals which are of low viscosity may be effectively sealed employing the seal of my invention. When liquid metals are sealed, contact with air must be especially avoided as they will burn when exposed thereto. The seal of the present invention accomplishes this most effectively.

Alternatively, a sleeve is employed between the wall 3 and shaft 2 to provide a sealing surface which can be adjusted easily for variations in tolerence.

It is noted that the seal described herein only operates during rotation of the shaft. During shutdown any commercially available shutdown seal is provided to prevent leakage.

It is now apparent that the invention attains the objectives set forth. Apparatus embodying the invention is sturdy in construction and well adapted for use with high pressure-low viscosity mediums. Sealing may be accomplished in a highly efficient way with no leakage or contamination thereof.

Although I have described a specific embodiment of my invention, my invention is not limited thereto since many modifications may be made by one skilled in the art and it is intended by the claims to cover all such modification as fall within the true spirit and scope of my invention.

What I claim as new and desire to secure by Letters Patent of the United States is:

1. A screw seal for a rotatable member projecting into a liquid comprising
   a stationary member surrounding the rotatable member,
   a first means to force flow of liquid back into its area of containment,
   means for placing a gas into contiguous relation with the liquid to aid in retaining the liquid within its area of containment,
   means for placing a buffer liquid into contiguous relation with the gas to retain the gas in the area wherein it is placed, and
   a second means to retain the buffer liquid in the area in which it is placed.

2. A screw seal for a rotatable member projecting into a liquid comprising
   a stationary member surrounding the rotatable member,
   a first thread to force flow of liquid to be sealed back into its area of containment,
   means for placing a gas into contiguous relation with the liquid to combine with said first thread to retain the liquid within its area of containment,
   means for placing a buffer liquid into contiguous relation with the gas to retain the gas in the area wherein it is placed,
   a second thread, and
   a third thread to act in combination with said second thread to retain the buffer liquid in the area in which it is placed.

3. A screw seal for a rotatable shaft projecting into an area of containment of a liquid comprising
   a stationary casing surrounding the rotatable shaft,
   a first series of threads positioned between the rotatable shaft and said stationary casing to force flow of liquid back into the area in which it is contained,
   means defining a port for placing a gas into contiguous relation with the liquid to prevent any leakage of the liquid,
   means for placing a buffer liquid into contiguous relation with the gas to retain the gas in the area wherein it is placed,
   a second series of threads adjacent said first series of threads and positioned between the rotatable shaft and said stationary member, and
   a third series of threads positioned adjacent said second series of threads and between the rotatable member and said stationary member to act in combination with said second series of threads to retain the buffer liquid in the area in which it is placed.

4. A screw seal for a rotatable shaft projecting into an area of containment of a liquid comprising
   a stationary casing surrounding the rotatable shaft,
   a first series of threads positioned between the rotatable shaft and said stationary casing to force flow of liquid back into the area in which it is contained,
   a gas placed in contiguous relation with the liquid to aid in retaining the liquid within its area of containment,
   means for placing a buffer liquid into contiguous relation with the gas to retain the gas in the area wherein it is placed,
   a second series of threads adjacent said first series of threads and positioned between the rotatable shaft and said stationary member, and
   a third series of threads positioned adjacent said second series of threads and between the rotatable shaft and said stationary member to act in combination with said second series of threads to retain the buffer liquid in the area in which it is placed.

5. A screw seal for a rotatable shaft projecting into an area of containment of a liquid comprising
   a stationary casing surrounding the rotatable shaft,
   a first series of threads positioned on the rotatable shaft to force flow of liquid back into the area wherein it is contained,
   means defining a port for placing a gas into contiguous relation with the liquid to prevent any leakage of the liquid,
   means defining a port for placing a buffer liquid into contiguous relation with the gas to retain the gas in the area wherein it is placed,
   a second series of threads positioned on the rotatable shaft adjacent said first series of threads, and
   a third series of threads positioned on the rotatable shaft adjacent said second series of threads to act in conjunction with said second series of threads to retain the buffer liquid in the area in which it is placed.

6. A screw seal for a rotatable shaft projecting into an area of containment of a liquid comprising
   a stationary casing surrounding said rotatable shaft,
   a first series of threads positioned on said stationary casing to force flow of liquid back into the area in which it is contained,
   means defining a port for placing a gas into contiguous relation with the liquid to prevent any leakage of the liquid,
   means defining a port for placing a buffer liquid into contiguous relation with the gas to retain the gas in the area wherein it is placed,
   a second series of threads positioned on said stationary casing adjacent said first series of threads, and
   a third series of threads positioned on said stationary casing adjacent said second series of threads to act in conjunction with said second series of threads to retain the buffer liquid in the area in which it is placed.

7. A screw seal for a rotatable shaft projecting into an area of containment of a liquid comprising
   a stationary casing surrounding the rotatable shaft,
   a first series of threads positioned on said stationary casing to force flow of liquid back into the area in which it is contained,
   a gas placed in contiguous relation with the liquid to aid in retaining the liquid within its area of containment,
   a buffer liquid placed in contiguous relation with the gas to retain the gas in the area wherein it is placed,
   a second series of threads positioned on said stationary casing adjacent said first series of threads, and
   a third series of threads positioned on said stationary casing adjacent said second series of threads to act in conjunction with said second series of threads to retain the buffer liquid in the area in which it is placed.

8. A screw seal for a rotatable shaft projecting into an area of containment of a liquid comprising
   a stationary casing surrounding the rotatable shaft,
   a first series of right hand threads positioned on the rotatable shaft to force flow of liquid back into the area in which it is contained,
   a gas placed in contiguous relation with the liquid to aid in retaining the liquid within its area of containment,
   a buffer liquid placed in contiguous relation with the gas to retain the gas in the area wherein it is placed,
   a series of left hand threads positioned on said rotating shaft adjacent said first series of right hand threads, and
   a second series of right hand threads positioned on the rotatable shaft adjacent said series of left hand threads to act in conjunction with said left hand threads to retain the buffer liquid in the area in which it is placed.

No references cited.

SAMUEL ROTHBERG, *Primary Examiner.*